US011281253B2

(12) United States Patent
Wilson et al.

(10) Patent No.: US 11,281,253 B2
(45) Date of Patent: Mar. 22, 2022

(54) TOUCH SCREEN PROTECTOR

(71) Applicant: Racing Optics, Inc., Las Vegas, NV (US)

(72) Inventors: Bart E. Wilson, Las Vegas, NV (US); Stephen S. Wilson, Las Vegas, NV (US)

(73) Assignee: Racing Optics, Inc., Las Vegas, NV (US)

( * ) Notice: Subject to any disclaimer, the term of this patent is extended or adjusted under 35 U.S.C. 154(b) by 418 days.

(21) Appl. No.: 16/076,774

(22) PCT Filed: Feb. 8, 2017

(86) PCT No.: PCT/US2017/016951
§ 371 (c)(1),
(2) Date: Aug. 9, 2018

(87) PCT Pub. No.: WO2017/139339
PCT Pub. Date: Aug. 17, 2017

(65) Prior Publication Data
US 2019/0050025 A1 Feb. 14, 2019

Related U.S. Application Data

(60) Provisional application No. 62/293,482, filed on Feb. 10, 2016.

(51) Int. Cl.
*G06F 1/16* (2006.01)
*G06F 3/041* (2006.01)
(Continued)

(52) U.S. Cl.
CPC .............. *G06F 1/1607* (2013.01); *B32B 1/00* (2013.01); *B32B 3/266* (2013.01); *B32B 7/05* (2019.01);
(Continued)

(58) Field of Classification Search
CPC ........................................................ B32B 1/00
See application file for complete search history.

(56) References Cited

U.S. PATENT DOCUMENTS 9,063,699 B1 6/2015 Huang
9,092,195 B1 7/2015 Huang
(Continued)

FOREIGN PATENT DOCUMENTS

EP 2942694 A1 11/2015
EP 3012708 A1 4/2016
(Continued)

OTHER PUBLICATIONS

European Patent Office, Extended European Search Report for European Patent Application No. 17750670.6 dated Nov. 14, 2019, 9 pages.
(Continued)

*Primary Examiner* — Ian A Rummel
(74) *Attorney, Agent, or Firm* — Fitch, Even, Tabin & Flannery, LLP

(57) ABSTRACT

A touch screen protector is removably attachable to a touch screen device. The protector attaches to the touch screen device about an outer peripheral portion of the touch screen, thereby not adhering to a central video display portion of the touch screen. The protector is pre-formed with a curvature that causes the protector, when attached to the device, to rise upwards and away from the touch screen. By biasing the protector away from the touch screen, the attached protector inhibits optical interference forming between the protector and the touch screen. The curvature is configured to provide a separation that is large enough to inhibit formation of optical interference between the protector and the touch screen, but small enough to maintain touch sensitivity of the touch screen.

17 Claims, 14 Drawing Sheets

(51) Int. Cl.
- *B32B 1/00* (2006.01)
- *B32B 27/06* (2006.01)
- *B32B 7/12* (2006.01)
- *B32B 33/00* (2006.01)
- *B32B 7/05* (2019.01)
- *B32B 17/00* (2006.01)
- *B32B 37/12* (2006.01)
- *B32B 27/36* (2006.01)
- *B32B 27/30* (2006.01)
- *B32B 3/26* (2006.01)
- *G06F 3/039* (2013.01)
- *G02B 1/14* (2015.01)

(52) U.S. Cl.
CPC ............... *B32B 7/12* (2013.01); *B32B 17/00* (2013.01); *B32B 27/06* (2013.01); *B32B 27/308* (2013.01); *B32B 27/36* (2013.01); *B32B 27/365* (2013.01); *B32B 33/00* (2013.01); *B32B 37/12* (2013.01); *G06F 1/1609* (2013.01); *G06F 3/0393* (2019.05); *G06F 3/041* (2013.01); *B32B 2250/02* (2013.01); *B32B 2307/41* (2013.01); *B32B 2307/412* (2013.01); *B32B 2307/50* (2013.01); *B32B 2307/546* (2013.01); *B32B 2457/208* (2013.01); *B32B 2571/00* (2013.01); *G02B 1/14* (2015.01); *G06F 2203/04103* (2013.01); *G06F 2203/04107* (2013.01)

(56) References Cited

U.S. PATENT DOCUMENTS

| | | |
|---|---|---|
| 2012/0200816 A1 | 8/2012 | Krasnov |
| 2014/0072749 A1 | 3/2014 | Leonhard |
| 2015/0309609 A1 | 10/2015 | Wilson |

FOREIGN PATENT DOCUMENTS

| | | |
|---|---|---|
| JP | 3199273 U | 8/2015 |
| WO | 2015002685 A1 | 1/2015 |

OTHER PUBLICATIONS

Li, H.-M., et al., "Influence of weight ratio in polymer blend film on the phase separation structure and its optical properties," The European Physical Journal of Applied Physics, 2009, No. 45, 20501—p. 1-p. 4.

Patent Cooperation Treaty, International Search Report of the International Searching Authority dated Apr. 25, 2017 for International Application No. PCT/US2017/016951 (2 pages).

Patent Cooperation Treaty, Written Opinion of the International Searching Authority dated Apr. 25, 2017 for International Application No. PCT/US2017/016951 (6 pages).

Wikipedia, "Anti-reflective coating." [Online] [Retrieved on Aug. 7, 2018]. Retrieved from the Internet <URL:https://en.wikipedia.org/wiki/Anti-reflective_coating> (14 pages).

Wikipedia, "Thermoforming," Feb. 8, 2016. [Online] [Retrieved on Mar. 23, 2017] Retrieved from the Internet <URL: https://en.wikipedia.org/w/index.php?title=Thermoforming&oldid=703986780> (2 pages).

TOUCH SCREEN PROTECTOR

RELATED APPLICATIONS

This application is a U.S. national phase application filed under 35 U.S.C. § 371 of International Application Number PCT/US2017/016951, filed Feb. 8, 2017, designating the United States, which claims the priority benefit of U.S. provisional application No. 62/293,482, filed Feb. 10, 2016, titled "Touch Screen Protector," which is hereby incorporated by reference in its entirety.

TECHNICAL FIELD

The present disclosure generally relates to protectors for touch screen devices. More specifically, the present disclosure relates to touch screen protectors that protect touch screen devices without directly adhering to an active display portions of the touch screen.

BACKGROUND

Some electronic devices, such as smart phones and tablets (e.g., the IPHONE and IPAD), have a touch sensitive screen that enables a user to interact with and operate the electronic device. The touch sensitive screen displays electronic buttons, icons, and search boxes that the user can activate or select by touching on the screen. Because these electronic devices are often portable, the touch sensitive screens can be subjected to factors that can result in cracking and scratching during normal use, or when the device is mishandled or dropped. The resulting damage from such use may be costly to repair and, in some situations, may even be irreparable.

Protective films that adhere to touch screens can leave unsightly floating air bubbles between the transparent protective film and the touch screen surface (e.g., glass surface) of the electronic device. This is a particular problem for "full adhesive" protectors that have an adhesive layer applied on all, or at least a significant portion of the adhering surface of the screen. That is, where a protector attaches to a device by way of an adhesive that is applied to essentially all of the lower surface, floating air bubbles can form between the protector, the touch screen, and the adhesive, and can cause optical issues that make the touch screen more difficult to read. Moreover, these "full adhesive" films do not provide an impact absorption or cushioning effect that protects the surface of the touch screen device.

SUMMARY

The present disclosure describes examples of a removable touch screen protector. The protector is configured to removably attach to a touch screen device, such as a smart phone, tablet computer, or other touch-operable interface. The protector attaches about an outer peripheral portion of the touch screen via an adhesive, but does not adhere to the central portion of the touch screen. So configured, the protector mounts to the touch screen in a manner that inhibits forming floating air bubbles or other undesirable optical artifacts between the protector, the adhesive, and the touch screen.

The protector is also pre-formed with a curvature (also referred to herein as a curl, bend, or curvature memory) that causes the protector—when attached to the device—to deflect away from the touch screen. This deflection provides an upward force that inhibits the protector from contacting or otherwise drawing too close to the touch screen while at rest. By biasing the protector away from the touch screen, the attached protector inhibits formation of optical interference (e.g., Newton rings, moiré interference patterns, chromatic interference, etc.) that can occur when a protective layer contacts or otherwise comes too close to the touch screen.

The curvature applied to the protector is configured based upon various factors and conditions that can include, for example, the size of the touch screen device that it will be applied to, and the weight and flexibility of the protector material. In particular, the pre-formed curvature of the protector is configured so that the protector attaches to the touch screen device with a separation that is large enough to inhibit formation of optical interference problems, but small enough to maintain the touch sensitivity of the touch screen through the protector.

BRIEF DESCRIPTION OF THE DRAWINGS

This builds upon, and incorporates by reference the entire disclosure, including the specification, drawings, and claims, of U.S. patent application Ser. No. 12/780,443 (now issued as U.S. Pat. No. 9,128,545), and all applications that claim priority thereto, including U.S. patent application Ser. No. 13/838,311 (now U.S. Pat. No. 8,974,620), Ser. No. 14/599,176 (now U.S. Pat. No. 9,114,256), Ser. Nos. 13/186,690, 14/642,406, and 14/794,156 (collectively referred to as "the Touch Screen Shield References"). In addition to the Figures of the Touch Screen. Shield References, the present application includes the following Figures that show examples of components, aspects, features, methods, and/or techniques in accordance with a least some inventive embodiments of the present disclosure.

FIG. 1 shows an example touch screen protector pre-formed with a longitudinal curl or curvature that deflects and/or biases the central portion of the protector upwards, or away from a surface that the protector attaches to.

DETAILED DESCRIPTION

The present disclosure describes examples of a removable touch screen protector and/or shield. The protector is configured to removably attach to a touch screen device, such as a smart phone, tablet computer, or other touch-operable interface. The protector may include, or may build upon one or more of the protectors and/or shields described in the Touch Screen Shield References, or variants thereof. That is, the protector may be configured so that adhesive is applied about a periphery of an inner side of the protector, so that when the protector attaches to a touch screen device, the central portion of the protector does not adhere to the central display area of the touch screen. In some embodiments, rather than adhering to the central display area, the protector forms a separation or air gap between the inner surface of the protector and the upper surface of the touch screen.

Some embodiments of the present application describe touch screen protectors (or simply "protectors") that are pre-formed with curvature. As used throughout this application, the term curvature (sometimes referred to as curl or curvature memory) refers to the properties of a sheet of material that cause it to bend out of its plane. When a curved, sheet is made flat, the inner surface develops tensile stress and the outer surface compresses. Together, the stresses generate a bending moment that causes the material to form a tube when free from force. Depending on the flexibility/rigidity of the material, the degree of curl applied thereto, and the forces acting on the material, the curl may or may not be noticeable to the naked eye. The present application describes touch screen protectors that are pre-formed with curvature to cause the protector to bend away from the touch screen to which it attaches. The curvature can be applied to a generally flexible material, such as a flexible film material, or to a more rigid material, such as glass.

Figure 12:
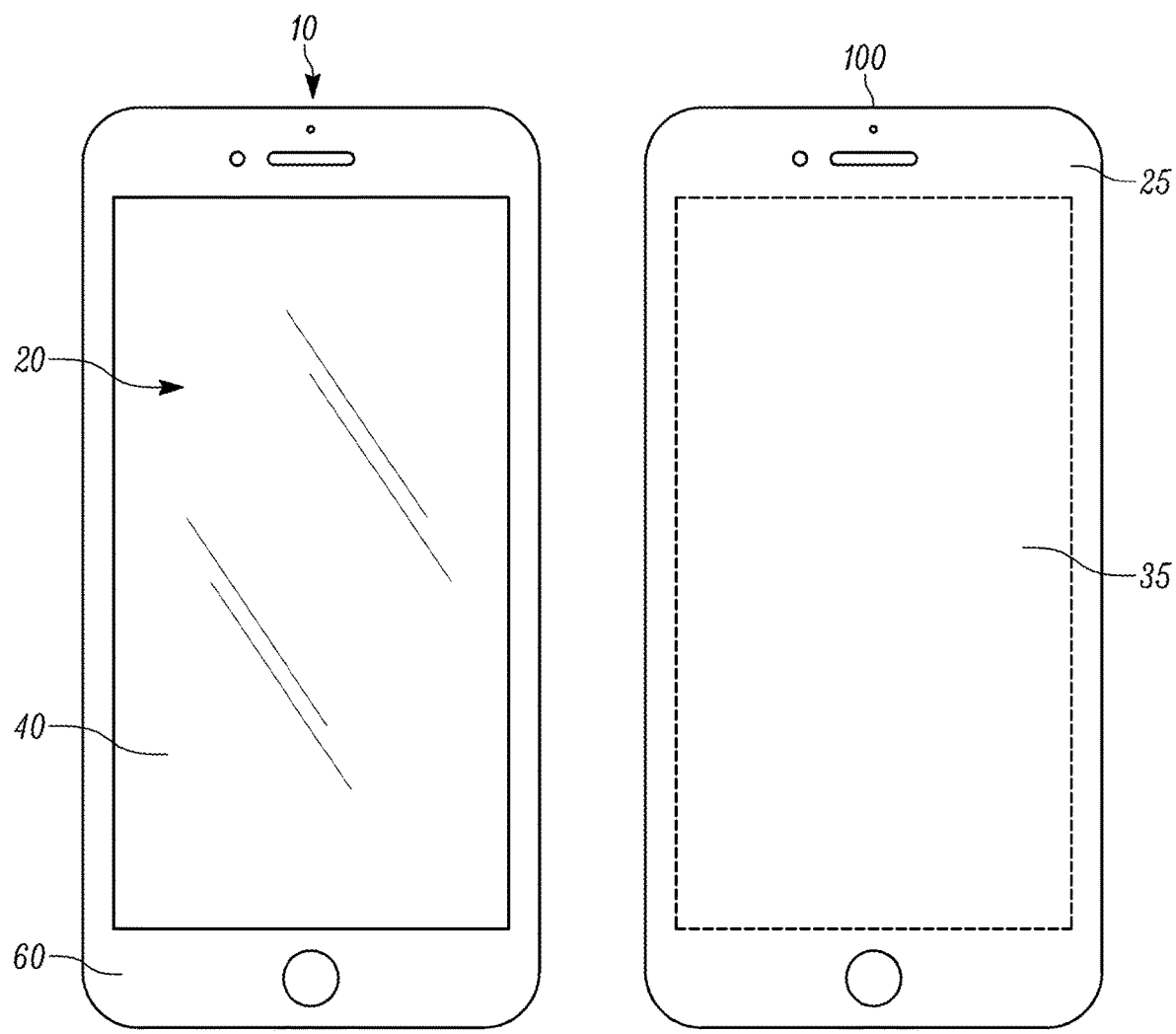
FIG. 12 is an exploded top view of an electronic device with an example of a protective shield mounted thereon.

One example of a protector attaches to the touch screen device about an outer peripheral portion of the touch screen. FIG. 12 shows an exploded view of an electronic device 10 with a touch screen surface 20 protected by a protective shield 100 mounted thereon. More specifically, the electronic device 10 is a smart phone (e.g., an IPHONE) with a touch operable surface 20 that allows a user to operate the electronic device 20 by capacitive touch.

The touch screen 20 defines an operating area 40 that is surrounded by a border area 25. The active display area 40 represents the central, operating area of the touch screen 20, and may correspond with a digital screen that changes display based on the operation of the electronic device. The active display area 40 may be partially or fully touch sensitive, providing a user interface that allows a user to manipulate, control, or otherwise operate the device 10. The active display area 20 may be disposed adjacent or enclosed within a border area 60.

The border area 60 may be an inactive area that surrounds the active display area 40, and may include features such as brand labelling, graphics, speakers, mechanical buttons, LED lights, non-graphical displays, and the like. In some instances, the border area 60 may include touch sensitive portions (e.g., touch sensitive buttons or icons) that also allow operation of the device 10. In some instances, the border 60 may exhibit all the functionality of the active display area 40. For example, in some instances where the electronic device 10 comprises a full display that extends between all edges of the device, the border area 60 may simply represent an outer area of the fully operating display. In other examples, the border area 60 may be inactive, or largely inactive, such that the border 60 provides limited or no operable functionality.

The active display area 40 of the touch screen 20 is protected by a shield or protector 100, which is disposed over the touch screen 20. In some configurations (including the examples shown in FIGS. 11A and 11B), the protector 100 attaches to the touch screen 20 so that the outer peripheral portion 25 of the protector 100 adheres to the border area 60 of the touch screen 20. In these examples, the attached protector 100 may form a space, or an air gap 122 (see FIG. 11B) between the central portion 35 of the protector 100 and the touch screen 20, as described in the references in the patent family of U.S. Pat. No. 9,128,545 (hereby incorporated by reference in its entirety). The protector 100 may attach via an adhesive 120 (see FIG. 11B) that is applied only about the outer peripheral portion 25 of a lower surface of the protector 100, and not on the central portion 35. Because of this adhesive application configuration, the protector does not adhere to the active display area 40 of the touch screen 20, which is typically the portion of the device that includes a visual display.

The outer periphery 25 of the protector 100 (i.e., the portion that has the adhesive) may correspond in size and/or shape to an inactive portion of the touch screen, or at least to a non-primary display portion of the touch screen. For example, the adhesive 120 may be applied in a pattern or shape that corresponds to the border 60 surrounding a display. The border 60 may be inactive or partially inactive, but typically will not be capable of all the same functionality of the primary display portion of the touch screen. In some examples, the touch screen device will have a 3-dimensional shape—that is, the touch screen 20 itself may have a curved surface. In such a situation, the touch screen protector 100 may also have a curved shape, or otherwise be configured to attach to the touch screen device 10 in a manner that covers the curved touch screen device without adhering tee the primary display portion of the curved touch screen.

The central portion 35 of the protector 100 corresponds to the central or primary display 40 portion of the touch screen 20. Because the central portion 35 of the protector (or at least a portion of the central portion) does not have adhesive, attaching the protector to the touch screen device will not adhere the protector 100 to the central or active display area 40. This may inhibit, mitigate, reduce, prevent, or even eliminate the formation of undesirable optical artifacts such as floating air bubbles, Newton rings, moiré interference patterns, and chromatic interference, while still maintaining touch sensitivity of the touch screen through the attached protector.

Figure 13:
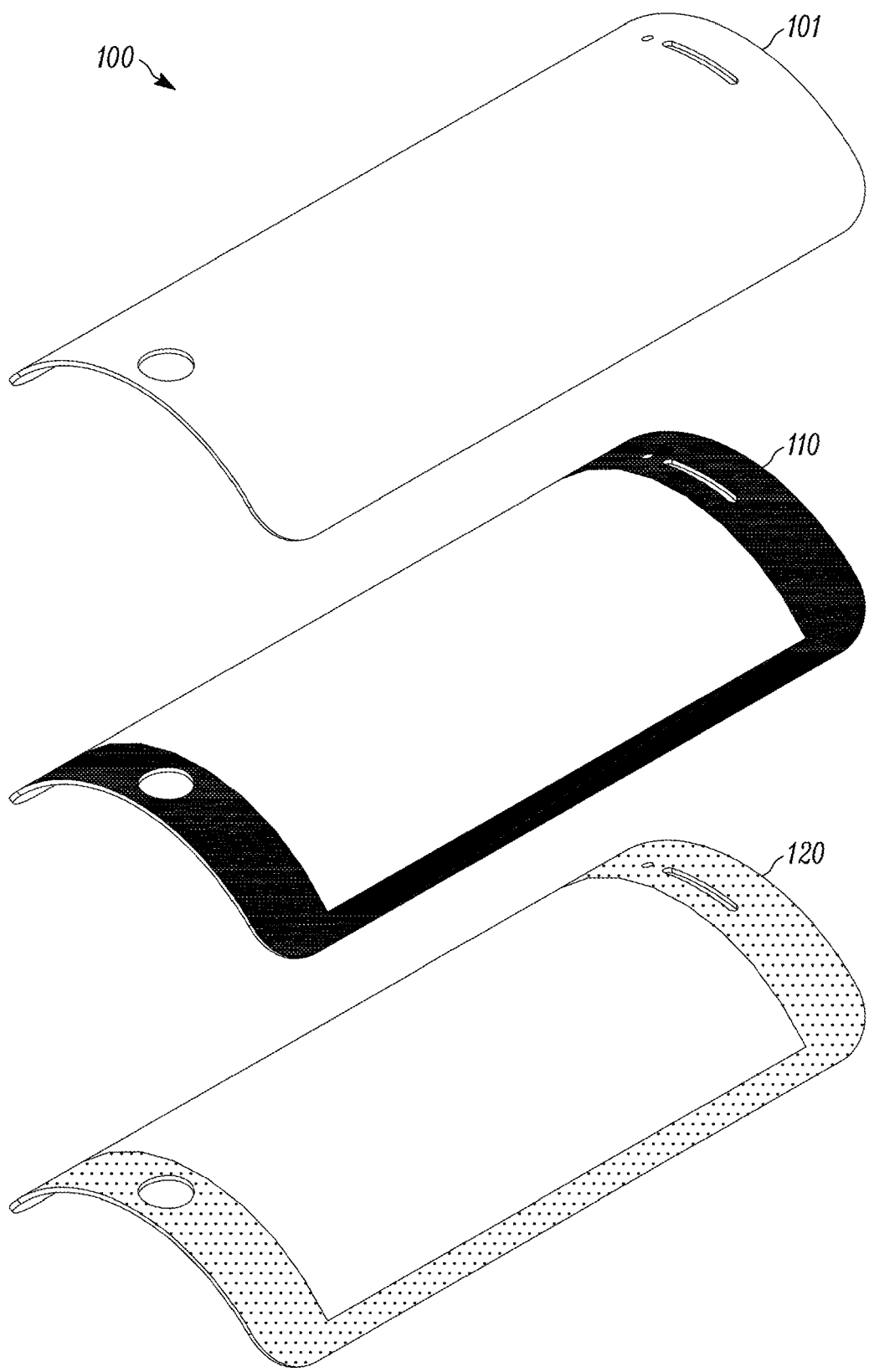
FIG. 13 is a blown-apart isometric view of a touch screen protector with an annular layer in accordance with aspects described in this application.

In some aspects the protector 100 may form a space, air gap, air bearing, or general separation between the protector and the touch screen. This separation can be formed, for example, via a thick adhesive, via a spacer such as an annular layer between the base layer of the protector and the adhesive, or combinations thereof. FIG. 13 shows an exploded view of a protector 100 that utilizes such a mask layer 110. As shown in FIG. 13, the protector 100 includes a base layer 101, which may have a pre-formed curvature. A mask layer 110 may include an opaque annular film that is adhered to an under-side of the base layer 101. The adhesive layer 120, which may include a pressure sensitive adhesive, is applied on the under-side of the mask layer 110. The pressure sensitive adhesive 120 may be configured to allow the shield to be removably attached to a touch screen, such that the adhesive layer 120 remains with the protector 120 (as opposed to sticking behind on the touch screen surface) upon removal. The mask layer 110 may include a pattern or darker appearance so as to mask or hide any bubbles that may result from the attachment of the protector to the touch screen device 10. The thickness of the mask layer 110 can cause the central portion of the protector to lift off of the touch screen, thereby causing, the separation. In some instances, the adhesive 120 may completely surround the touch screen, thereby forming an enclosed air gap (e.g., as planar air bearing) between the protector and the touch screen. The enclosed air gap can serve as a cushion, thereby providing added protection to the touch screen device.

It has been found that in some situations, depending on some factors, an attached protector may still contact (or come in close proximity) the touch screen in certain areas. These factors include, for example, the separation between the attached protector and the touch screen, the thickness of the protector, the material of the protector, the rigidity, stiffness, or hardness of the protector, the weight of the protector, the size of the touch screen and protector, unintended or unrecognized concave curl of the protector, ambient temperature and air pressure, moisture levels between the protector and the touch screen, the thickness of the spacer/adhesive/annular layer, and static attraction between the touch screen and the protector. Such contact (or near contact) between the protector and the touch screen can occur during or after operation of the touch screen device, for example, because friction or static generated between the touch screen and the protector generates an attractive force between the two. The contact (or near contact) can also occur even when the device is not in operation, for example, because the protector can sag or drop in certain portions. This contact (or near contact) can generate undesirable optical effects, interference, or artifacts (e.g., Newton rings).

To alleviate these undesirable optical effects, the presently described touch screen protectors are configured to bend or deflect away from the touch screen once attached. This affinity to deflect can occur because of a curl or curvature that has been pre-formed in the protector.

The pre-formed curvature is generally provided to form a convex, parabolic protector. That is, the curvature is provided so that an attached protector will have a propensity to lift off or bend away from the touch screen of the device to which it attaches. By biasing the protector away from the touch screen, the attached protector inhibits formation of negative optical interference such as Newton rings, moiré interference patterns, and chromatic interference that are sometimes visible when a protector is in contact or near contact with the touch screen that it protects. Moreover, a curved protector, when attached at the opposing edges, forms a convex shield that can serve as a cushion to deflect or mitigate impacts and other forces, thereby providing added touch screen protection.

The protectors described herein can be made of flexible materials, for example, plastic films such as PET films, polycarbonate films, and/or any of the materials described in the Touch Screen Shield References. Other protectors can be formed of more rigid materials, such as glass or harder plastics (e.g., polycarbonate, acrylic, etc). While the techniques for forming pre-curvature in flexible and rigid protectors may differ, the effects may nevertheless be the same. That is, whether the shield is flexible or rigid, pre-forming a curvature in the protector generates a propensity in the protector to lift itself away from an attached surface. This lift propensity helps maintain adequate separation between the central portion of an attached protector and the touch screen shield. This lift propensity can also overcome forces that may be apt to draw the protector into contact or close proximity with the touch screen, such as gravity, static, or other factors. The curvature may be significant enough to lift the protector and inhibit the formation of optical artifacts, while also being subtle enough such that the touch screen of the electronic device still maintains touch sensitivity, and thus can still be operated through the attached protector.

Figure 1:
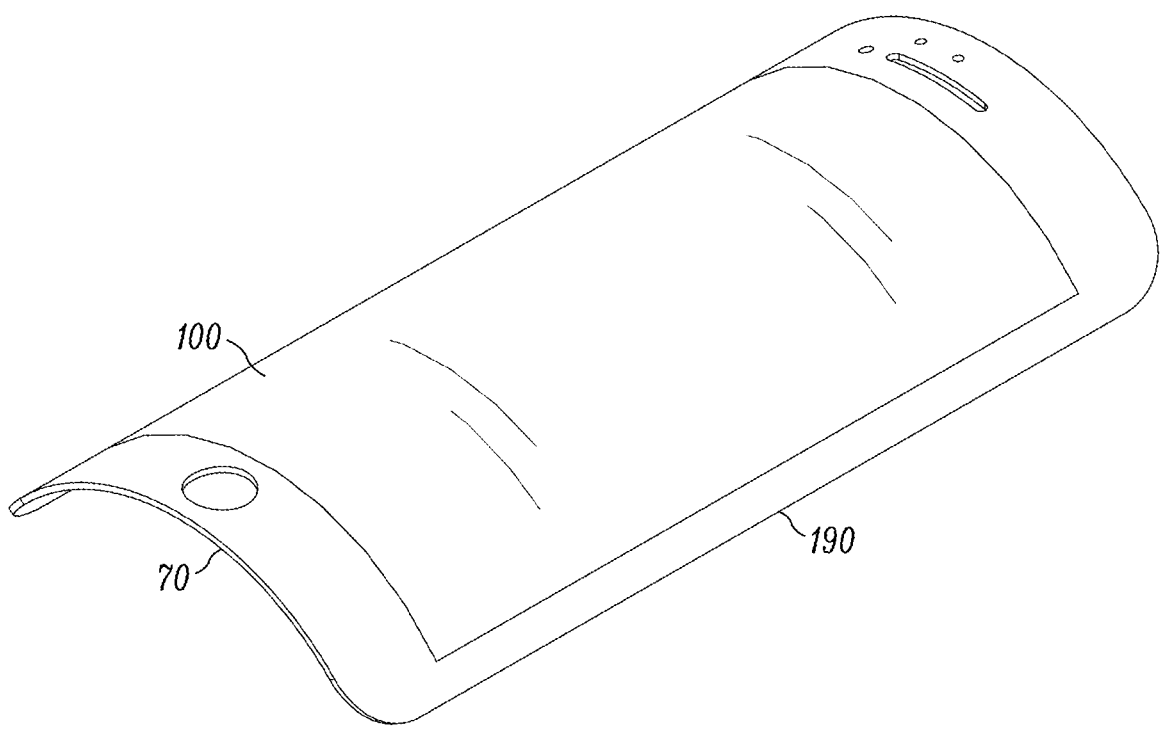

FIG. 1 shows an example of a touch screen protector 100 pre-formed with a longitudinal curvature that deflects or bends the central portion of the protector up, or away from the mounting surface. The protector 100 of FIG. 1 is not attached to a device, thus the curvature may be more pronounced than it would otherwise be while attached. This is because the edges, in particular the top and bottom edges (corresponding to the top and bottom portions of the electronic device) are not adhered or anchored to a surface, and are therefore allowed to rise up along with the central portion of the protector 100. It should be noted that while the protector 100 of FIG. 1 is shown with, a certain pre-formed curvature that is significant and identifiable for demonstrative purposes, it is other protectors having pre-formed curvatures that are less, or even significantly less than that shown in FIG. 1 could also be employed with successful results. The amount of curvature necessary in the shield will depend on a number of factors, including but not limited to, the size of the protector and touch screen, the flexibility/rigidity of the protector, the thickness of the protector, the type, of material forming the protector, and the sensitivity of the touch screen device, for example.

Figure 11A:
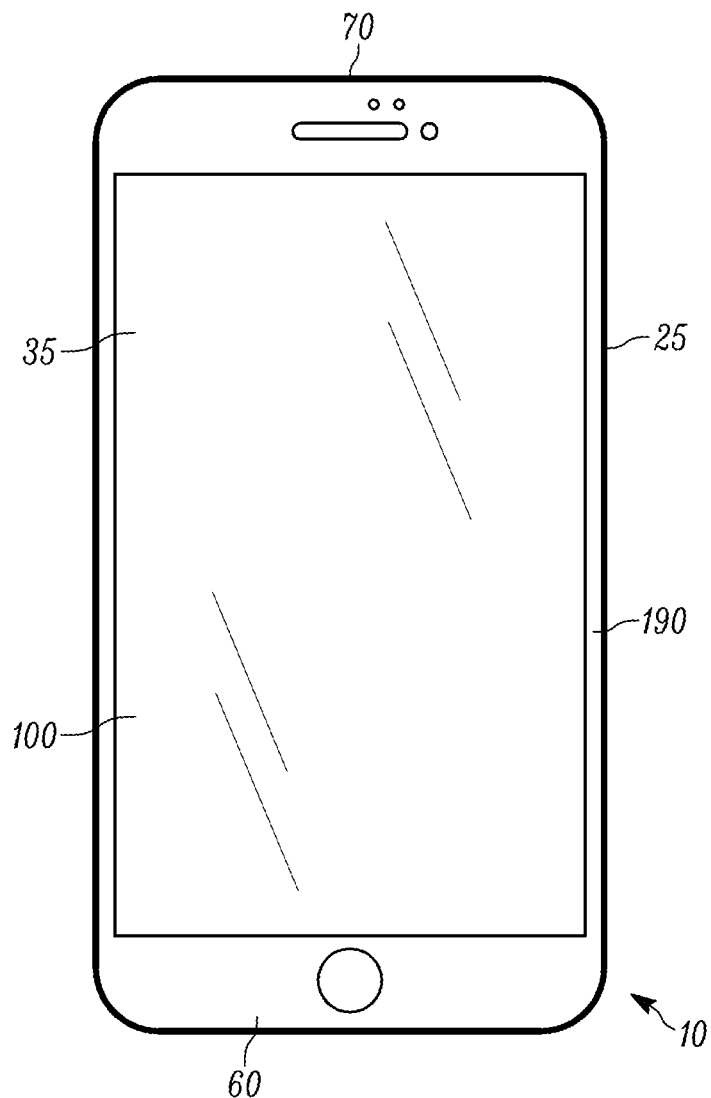
FIGS. 11A and B show top and side cross-sectional views, respectively, of a touch screen protector attached to a touch screen device in accordance with examples described in this application.
Figure 11B:
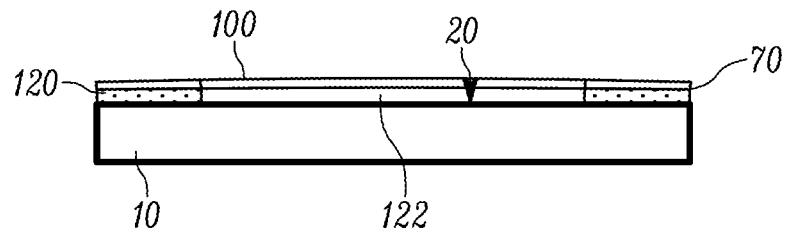

FIGS. 11A and B show an example of a touch screen protector 100 attached to a touch screen device 10. In particular, FIG. 11A shows a front or top view of a touch screen device 10 with a protector 100 mounted thereon, and FIG. 11B shows a cross-sectional side view thereof. The touch screen device 10 can include a smart phone, tablet, or other mobile touch-operated device that includes a touch screen surface 20. As shown, the touch screen protector 100 has a shape and configuration that corresponds to that of the touch screen device 10. The protector has a central portion 35, which is generally transparent such that the active display area of the touch screen 20 can be readily viewed. The outer peripheral portion 25 of the protector 100 surrounds the central display area 35, and corresponds in size and/or shape, generally, with that of the border area 60 of the touch screen surface 20 of the device 10.

In the cross-sectional view of FIG. 11B, the outer peripheral portion 25 of the shield is applied with an adhesive layer 120, which adhesive layer 120 attaches the protector 100 to the device 100. In some embodiments, the adhesive 120 is a pressure sensitive adhesive, and is applied about just the outer periphery of the protector 100 in a manner such that the adhesive corresponds to a border area 60 or outer perimeter of the touch screen surface 20. The adhesive 120 is applied about an interior surface of the protector 100 in a manner such that the adhesive 120 corresponds to the border area 60 or the outer perimeter of the touch screen surface 20 that surrounds the active display area. The adhesive 120 may be applied only, or essentially only, about the outer peripheral area such that no adhesive is applied to the central portion 35 of the protector 100. In this way, the protector 100 can mount to a device without adhering to the active area e the display portion) of the touch screen 20. In some forms, the adhesive 120 may further include a spacer or an annular layer to allow for further spacing between the protector 100 and the touch screen 20, and/or to provide a patterned appearance that inhibits visibility of the adhesive and/or air bubbles formed between the protector 100 and the device 10 that it attaches to.

As shown in FIG. 11B, the protector 100 has a pre-formed curvature that facilitates maintaining the air gap 122 or separation between the touch screen and the protector. The curvature may be more or less pronounced than what is shown in FIG. 11B, but the curvature is provided in a manner that forms a convex curve relative to the upper surface of the protector 100. That is, the pre-formed curvature forms a curve that facilitates lifting of the in the attached protector 100 of FIGS. 11A and B, the curvature may be more or less pronounced than when the protector 100 is unattached, but the curvature is still sufficient to cause the protector 100 to bend away from the touch screen surface 20, facilitating the formation of a spacing 122, such as an air gap or other form of separation, between the protector 100 and the active area 40 of the touch screen surface 20. The spacing 122 shown in FIG. 11B, and in particular, the thickness of the adhesive 120, may not be drawn to scale. The adhesive 120 and the spacing 122 are pronounced in FIG. 11B for demonstrative purposes. In many embodiments, the thickness of the adhesive layer 120 and the spacing 122 will be thinner than the thickness of the protector 100 to maintain the touch sensitivity of the touch screen 20 through the attached protector.

The formation of the air gap or spacing 122 can also be facilitated by the adhesive 120 and/or other layer (e.g., a film layer, a mask layer, a double-sided tape, etc.) between the touch screen device 10 and the outer perimeter of the protector 100, such that the layers provide lift and separation between the protector 100 and the touch screen 20 of the device 10. FIG. 12 shows an example of such a protector 100. However, the curvature of the shield helps provide a lift, tendency, or bias that facilitates this separation, particularly across the middle of the touch screen 20, and thereby inhibits sagging and contact between the protector 100 and the touch screen 20. Further, once the protector 100 is attached in this manner, the curved protector 100 can provide a spring-back cushioned effect, as the attached rails 190 (i.e., the adhesive 120 securing, the edges 70 of the protector 100 to the border area 60 that surrounds the active area 35 of the touch screen 20 of the device 10) inhibit lateral movement of the protector edges 70 when the curved protector is pressed.

The pre-formed curvature of the touch screen protector 100 is configured to facilitate separation 122 between the protector 100 and the touch screen 20, while still maintaining a proximity so that the touch screen 20 can be readily operated through the protector 100. That is, though the attached protector 100 may be separated from the touch screen 20, a finger or stylus touching or pressing down on the protector 100 will still be close enough to effect capacitive touch recognition. In some embodiments, the protector 100 will be configured so that the adhesive/spacer/annular layer 120 and the pre-formed curvature help the protector 100 to maintain a minimum separation that inhibits formation of undesirable optical interference. The desired minimum separation level can vary depending on various circumstances that include but are not limited to, the material properties of the touch screen 20 and the protector 100, moisture levels between the two surfaces, and the weight and flexibility of the protector 100. In some circumstances, the minimum separation will be at least about 3 to about 5 microns while not in operation (i.e., while not being pressed or touched by a user). In other situations, it may be preferred to maintain a minimum separation of about 10 microns, or even about 50 microns to assure that the attached protector 100 does not generate optical interference with respect to the touch screen 20. The protector will also be configured to maintain a maximum separation to assure that the touch screen 20 maintains capacitive touch sensitivity through the attached protector/shield 100. This maximum separation can also vary depending on various factors, including but not limited to the touch sensitivity of the touch screen 20, the thickness and insulating properties of the protector material, and the touch accuracy demands expected by the user. For example, in some situations, it may be preferred to maintain a maximum separation of about 400 microns. In other situations, it may be preferable to maintain a smaller maximum separation of about 300 microns, or even 200 microns, so as to maintain high touch sensitivity of the touch screen 20 through the attached protector/shield 100.

As noted above, the desired separation between protector 100 and touch screen 20 may depend on a number of factors, and an ideal separation range for one application may not be ideal or even suitable for other applications. That is, depending on the touch sensitivity of the screen 20, the thickness and conductivity of a protector 100, the flexibility/rigidity of the protector 100, the size of the touch screen 20 and the protector 100, and the material properties of the protector 100 and the touch screen 20, it may be more or less preferable to aim for a higher or lower separation 122 distances. For example, in some situations the attached protector 100 will be configured to maintain separation of between about 75 to about 100 microns when not in operation so as to maximize touch sensitivity of the touch screen, while minimizing the likelihood of the protector 100 generating optical interference from being too close to the touch screen 20. In operation, of course, the protector 100 may deflect to bring the protector 100 into close proximity or even contact with the touch screen 20. However, upon release, the pre-formed curvature may act as a spring that deflects the central portion of the protector 100 off the touch screen 20.

The degree curvature provided to the protector will also vary depending on a number of factors. For example, in some situations, a higher degree of curvature will be appropriate for protectors configured to protect a larger touch screen. For larger screens, the protector 100 will have to span a larger distance between edge rails 190 (i.e., the points at which the protector 100 contacts the device 10), and will thus require higher forces to maintain separation from the central portion of the touch screen 20. In such a situation, applying a higher degree of curvature will generate a greater upward deflection force, thereby helping maintain separation over the greater surface area. For example, a protector that is configured to protect an 11 to 13-inch touch screen of a tablet device (e.g., an IPAD)), may be configured with a higher degree of curvature than a similar protector product configured to protect a smart phone having a 4-6 inch display (e.g., an IPHONE). Of course, other factors may also be relevant into the amount of curvature suitable for a particular product, including but not limited to the thickness and flexibility of the protector material.

As noted above, the presently described protectors inhibit formation of undesirable optical effects. The described protectors can inhibit these undesirable optical effects without incorporating additional components or objects into the protector 100. For example, the described protectors can inhibit forming Newton rings or other optical interference without using coatings, sprays, bumps, dots, and separators, which all add expense and complications to the formation of the protector 100. Further, such coatings, sprays, bumps, dots, or separators can negatively impact the optical clarity through the protector 100. Further still, these features do not add the additional cushioning effect that a protector with a pre-formed curvature can provide.

The pre-formed curvature can be applied to the protector 100 in a variety of ways. For example, the protector 100 can be formed or molded during or after manufacture to provide a convex curl. In a large scale manufacturing process, the curvature can be added by way of a molding process that occurs before, during, or after the formation (e.g., the laminating, cutting, printing, etc.) of the protector 100. The molding process can be provided with added heat to help set the protector 100 in the molded shape. For example, the protector 100 can be molded using a controlled industrial thermos-molding process.

Figure 2:
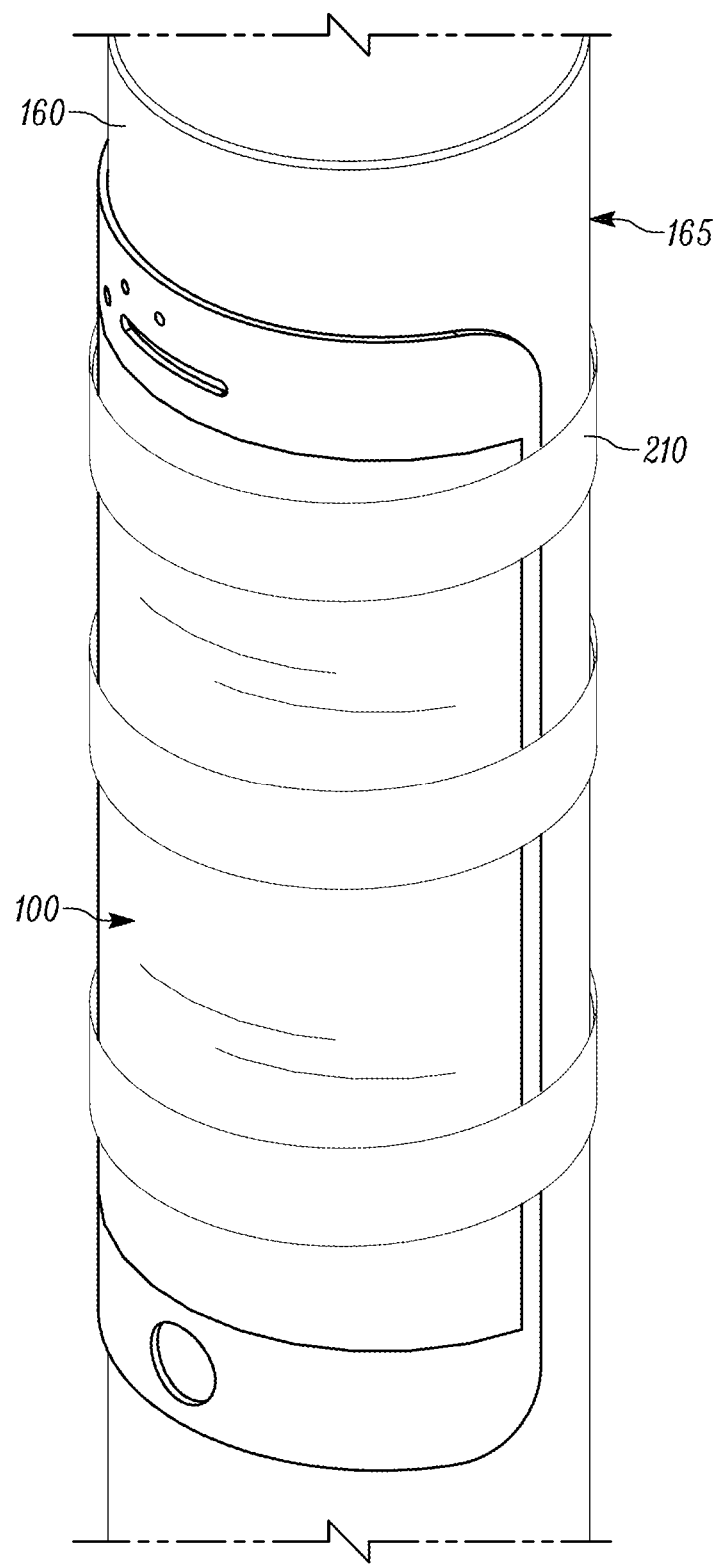
FIGS. 2 and 3 show examples of touch screen protectors wrapped along their longitudinal axes around an outer diameter of a tube to form a longitudinal curl or curvature in the protector.
Figure 3:
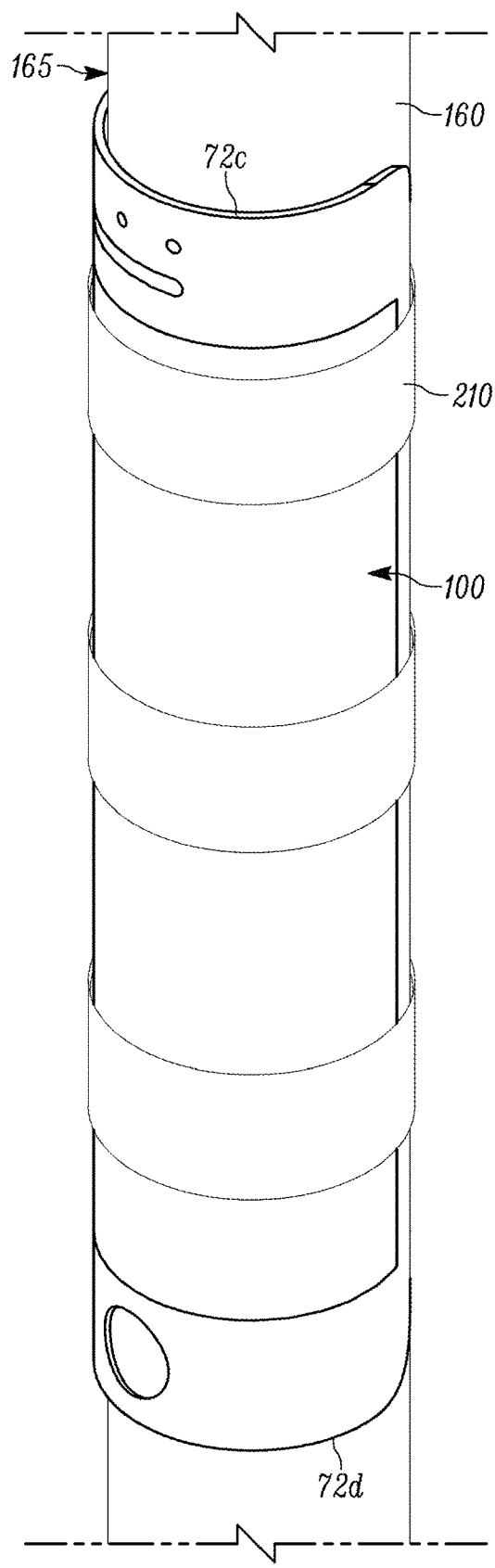

Additionally and/or alternatively, the protector 100 can be cut from a material that is originally provided in roll stock, which roll stock can be designed to establish a curvature memory in the material. The roll stock may need to be specifically configured, for example, so that the material curves in an appropriate direction (e.g., to form a convex shape when attached to a screen), and at an appropriate level (e.g., to form a suitable separation when attached to the screen). In some aspects, the pre-formed curvature can be provided by rolling or curling the protectors in a convex direction, and maintained in that position for a predetermined period of time. FIGS. 2 and 3 show examples of touch screen protectors 100 curled about their longitudinal axes around an outer diameter 165 of a tube or mandrel 160. The tubes 160 of FIGS. 2 and 3 are of different diameters. The protectors 100 are shown maintained in the curled position via tape 210, but other holding devices could be used, such as clips, clamps, or the like.

Figure 4:
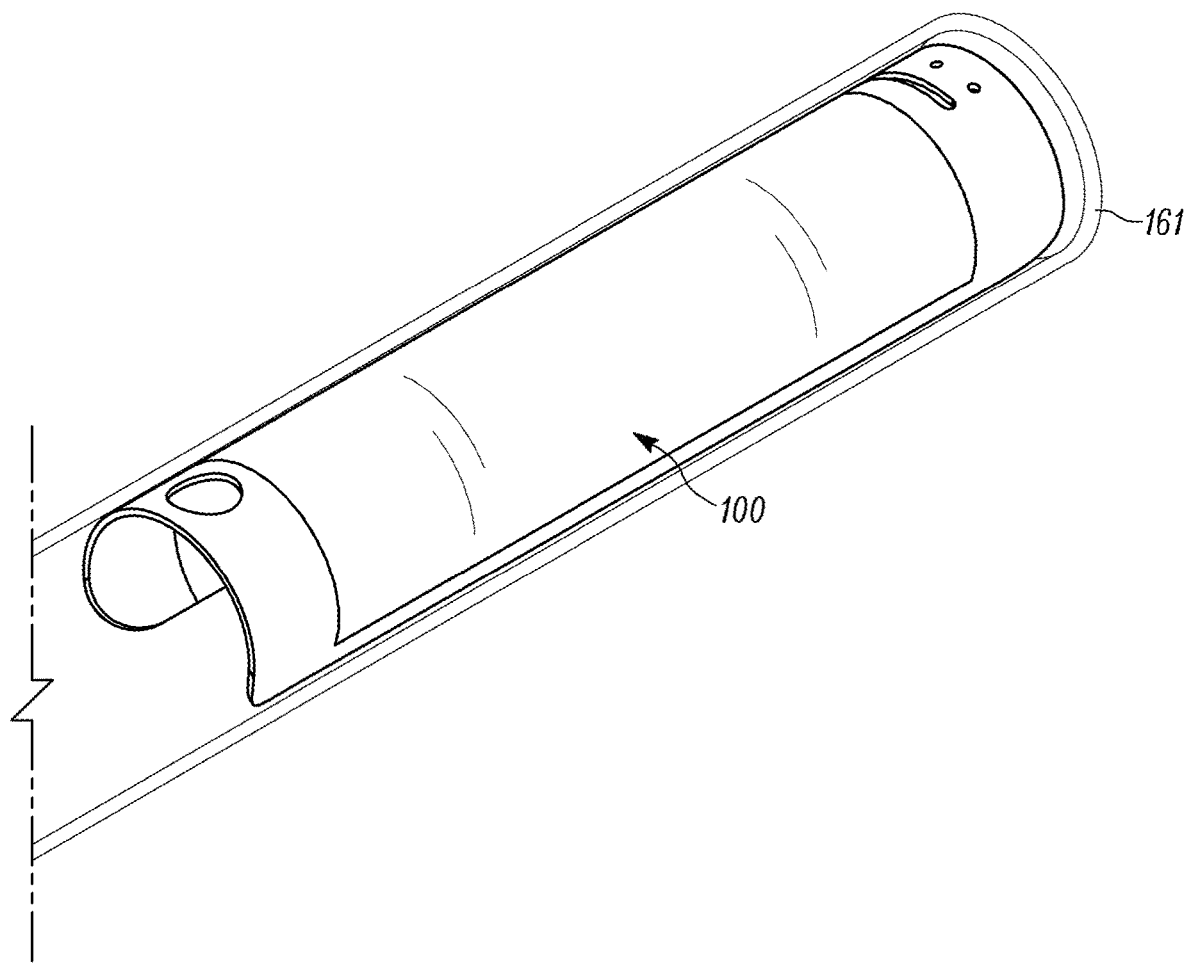
FIGS. 4 and 5 show examples of touch screen protectors rolled along their longitudinal axes and inserted into a tube to form a longitudinal curl or curvature in the protector.
Figure 5:
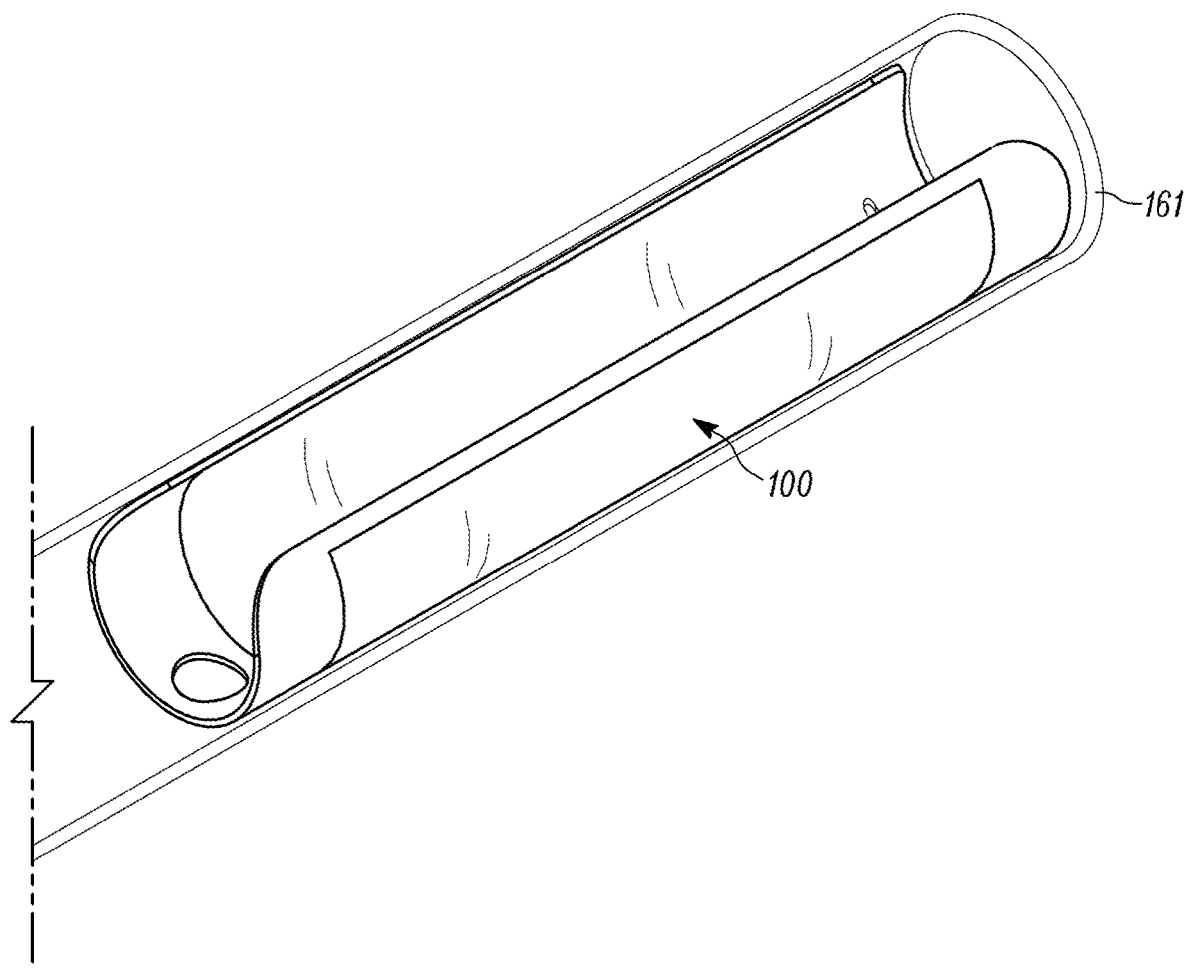
Figure 6:
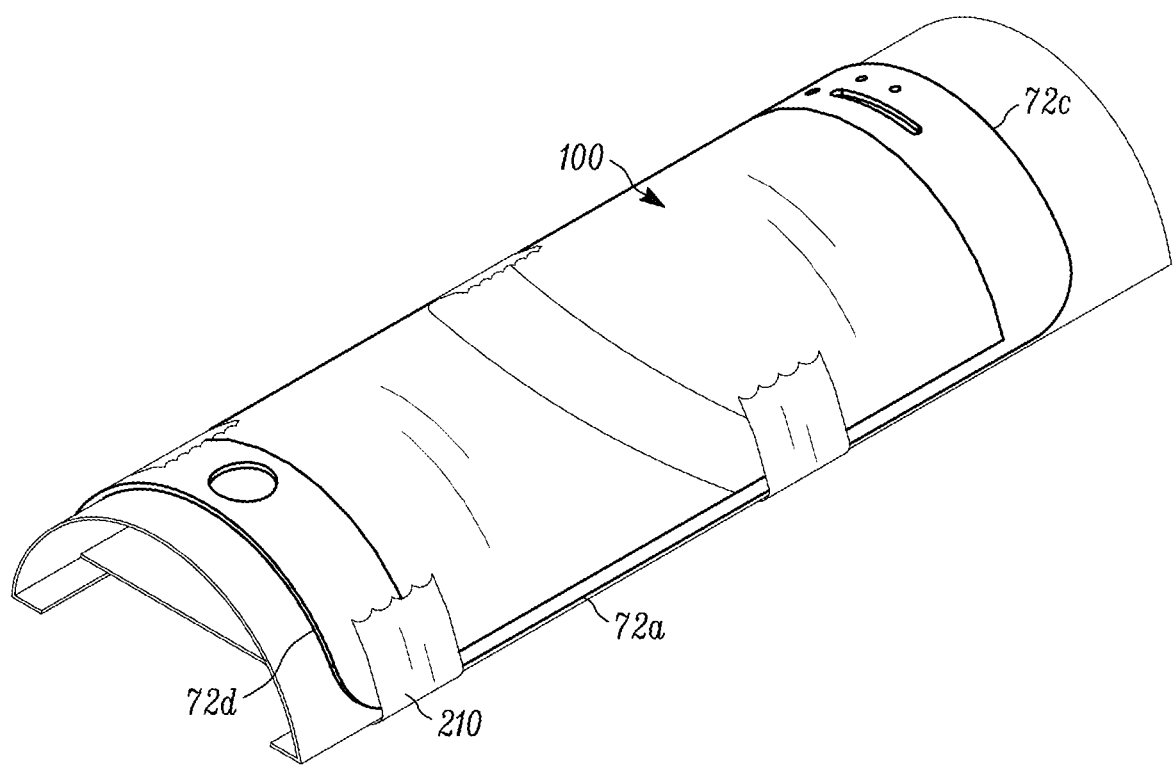
FIG. 6 shows an example touch screen protector rolled along its longitudinal axes around a semi-cylinder to form a longitudinal curl or curvature in the protector.

FIGS. 4 and 5 show examples of touch screen protectors 100 rolled along their longitudinal axes and inserted into a tube 161. Specifically, FIG. 4 shows the protector 100 rolled in the tube 161 with the edges curled away from the view point, and FIG. 5 shows the opposite side, with the protector 100 curled with the edges curled toward the view point. FIG. 6 shows a touch screen protector 100 rolled along its longitudinal axes around a semi-cylinder to form a longitudinal curl or curvature in the protector 100. In some aspects, the pre-formed curvature can be applied to a protector by inserting the protector into a mold, by stamping the protector with a die or press, or other techniques.

The protectors in FIGS. 2-6 are shown curled in two dimensional space. That is, these protectors are curled about the longitudinal direction so that the right and left side edges (72a and 72b, respectively, though the left edge 72b is obscured) curl toward each other rather than the top and bottom edges (72c and 72d, respectively). This longitudinal curl molds the protector in a direction to form a taco-like shape during molding, it was found during experimentation that this 2-dimensional longitudinal curl generated better results than did 2-dimensional transverse curls (e.g., protectors curling the top and bottom edges toward each other) for certain applications. However, different molding techniques and different curling effects may be preferred for different applications. For example, the level and type of curl, and the molding technique may depend on factors that include, but are not limited to, the touch sensitivity of the touch screen, the size of the touch screen, the weight of the protector, the rigidity of the protector, the thickness of the adhesive, spacer on the protector, and other features.

Figure 7:
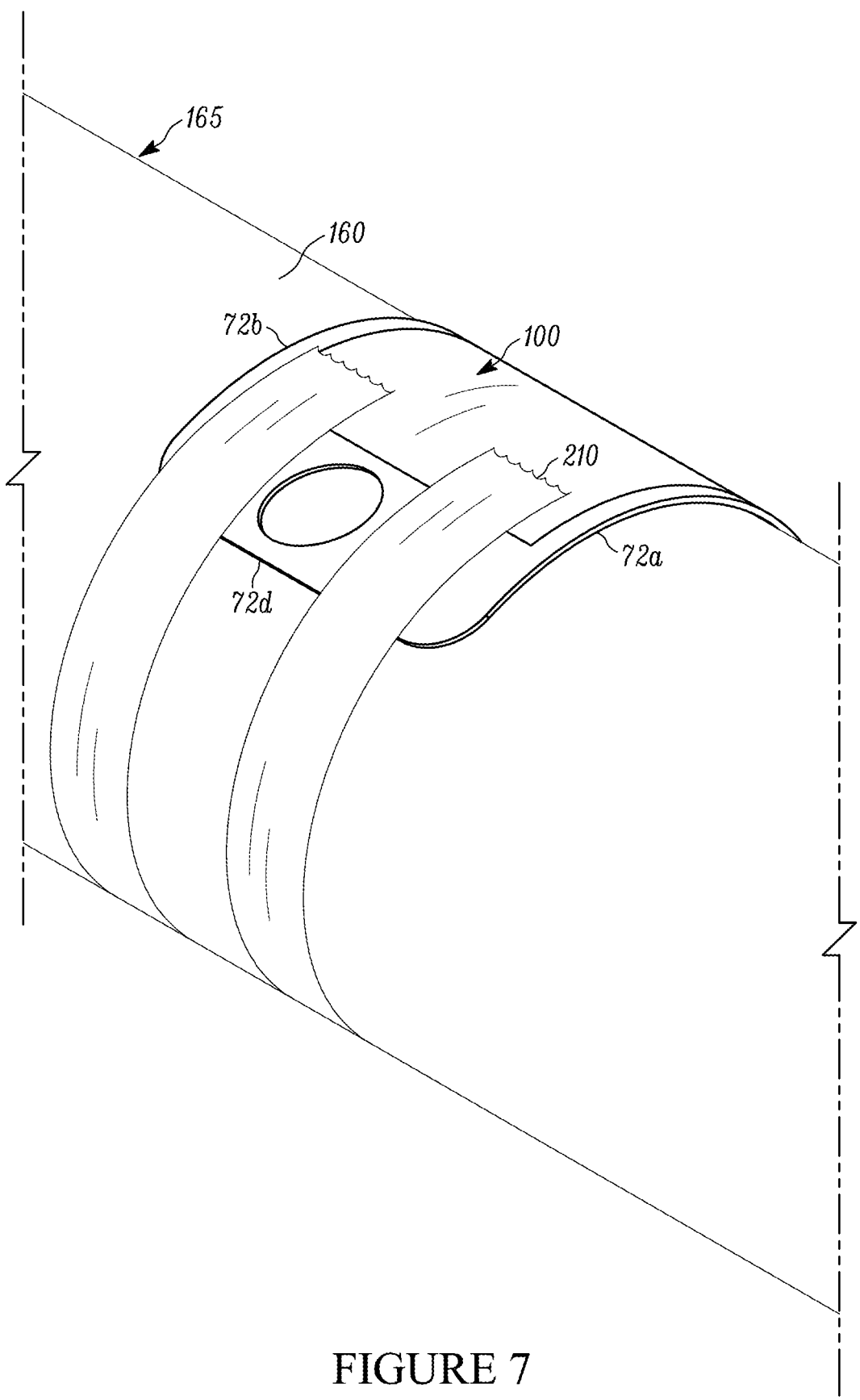
FIG. 7 shows an example touch screen protector wrapped along its transverse axis around an outer diameter of a tube to form a transverse curl or curvature in the protector.
Figure 8:
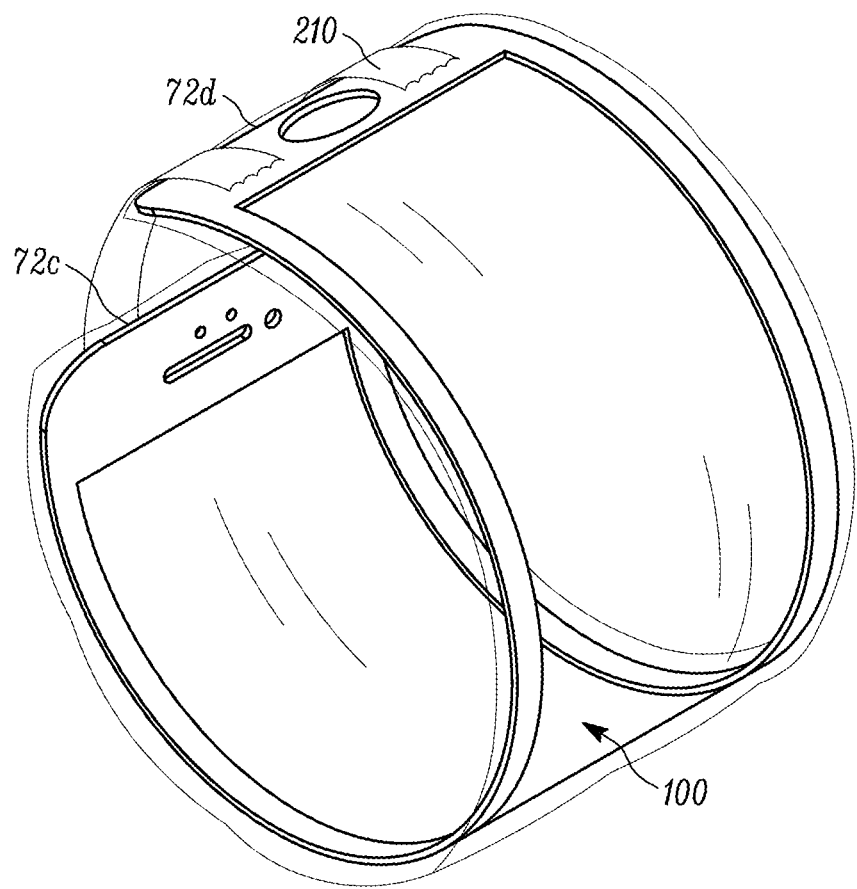
FIG. 8 shows an example touch screen protector rolled along its transverse axis and maintained in the rolled position with adhesive tape to form transverse curl or curvature in the protector.

In some examples, curvature can be formed in a protector about a transverse axis. That is, it may be beneficial to form a curvature that causes the upper and lower edges of the protector to curl toward one another. FIGS. 7 and 8 show protectors 100 being molded to pre-form a curl about the transverse axis, with the top 72c and bottom edges 72d (FIG. 8) of the protector 100 rolled toward one another. More specifically, FIG. 7 shows a touch screen protector 100 wrapped along its transverse axis around an outer diameter 165 of a tube 160 to form a transverse curl in the protector 100. FIG. 8 shows an example touch screen protector 100 rolled along its transverse axis and maintained in the rolled position with adhesive tape 210 to form transverse curl or curvature in the protector 100.

In still other examples, the protector can be formed with multiple curvatures, such that the protector curves about multiple axes and/or in three dimensional space. This multi-axis curvature can be applied by way of molding, whereby the molds are configured to curve the protector in three dimensional space. For example, the protector can be configured to curve about both the longitudinal axis and the transverse axis. The protector can be additionally and/or alternatively configured to curve about other axes as well, to conform the protector to the shape of the touch screen and the desired separation level. Some of the curvature can be applied to provide lift to the protector when attached to a device. However, other forms of curvature can be added to the protector to correspond to specific shape or structure of the touch screen (e.g., a curved touch screen), or for aesthetic purposes, for example.

The size and shape of a mold used to pre-form the curvature in the protector will depend on a number of factors, including but not limited to the thickness of the protector, the size of the protector, the material forming the protector, the stiffness and brittleness of the protector, the malleability of the protector, the size of the touch screen, and the desired amount of deflection. In one example, it was found that rolling a protector and inserting the protector into a tube having an inner diameter of about 1⅞" (1.875 inches) (see, e.g., FIG. 4), and leaving that protector in a tube overnight (e.g., greater than 8 hours) without heat resulted in a protector with a desired level of pre-formed curvature on a protector for a smart phone device.

The amount of time for the molding/pre-forming of the curl will depend on a number of factors, including but not limited to the malleability of the protector, the level and duration of heat applied during the molding process, the size of the protector, the size of the touch screen, the amount of deflection desired, and the molding technique applied. For instance, in some situations, it may be desirable to mold the protector for a longer period, such as 8+ hours (or overnight), or even over 24 hours. In other situations, less molding time may be more appropriate, such as 4 hours, 2 hours, 1 hour, 30 minutes, 10 minutes, or even less. In some examples, for example, where heat is used to facilitate setting the protector, the time for molding can be significantly less.

As noted, it may be beneficial to apply heat in some situations to facilitate the molding process. The heat can help soften the material of the protector, or otherwise make the protector more prone to plastic deformation. In some situations, heat can be used in conjunction with a quenching or cooling process that facilitates setting the protector in the pre-formed shape. This can reduce the amount of molding time needed to pre-form the curvature. However, depending on the level of heat, and other factors, heat may have a detrimental effect if it is not applied in an appropriate manner.

EXAMPLES

Figure 9:
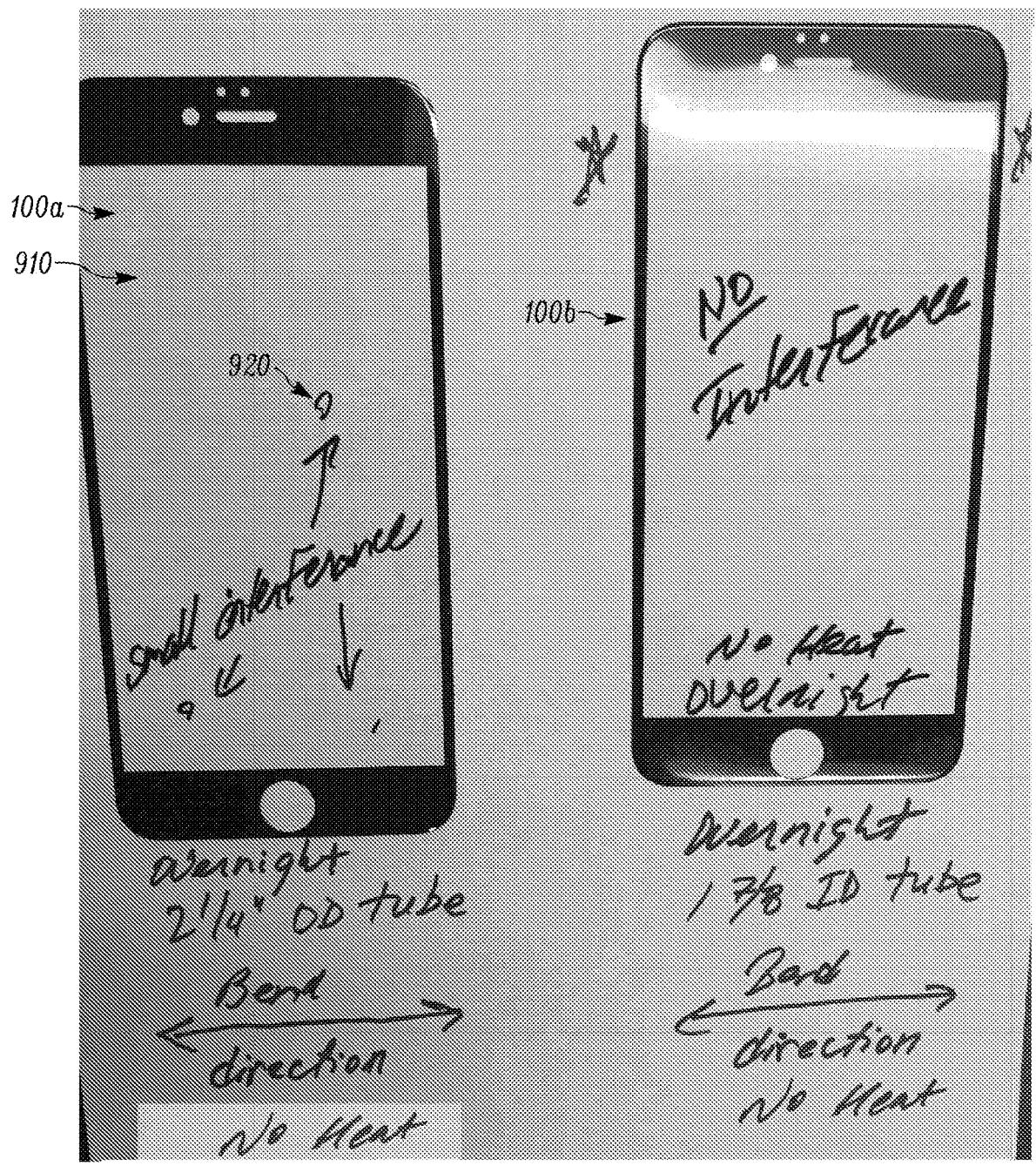
FIG. 9 is a photograph showing two touch screen protectors pre-formed with a longitudinal curl or curvature using different molding techniques, and details pertaining to the protectors.
Figure 10:
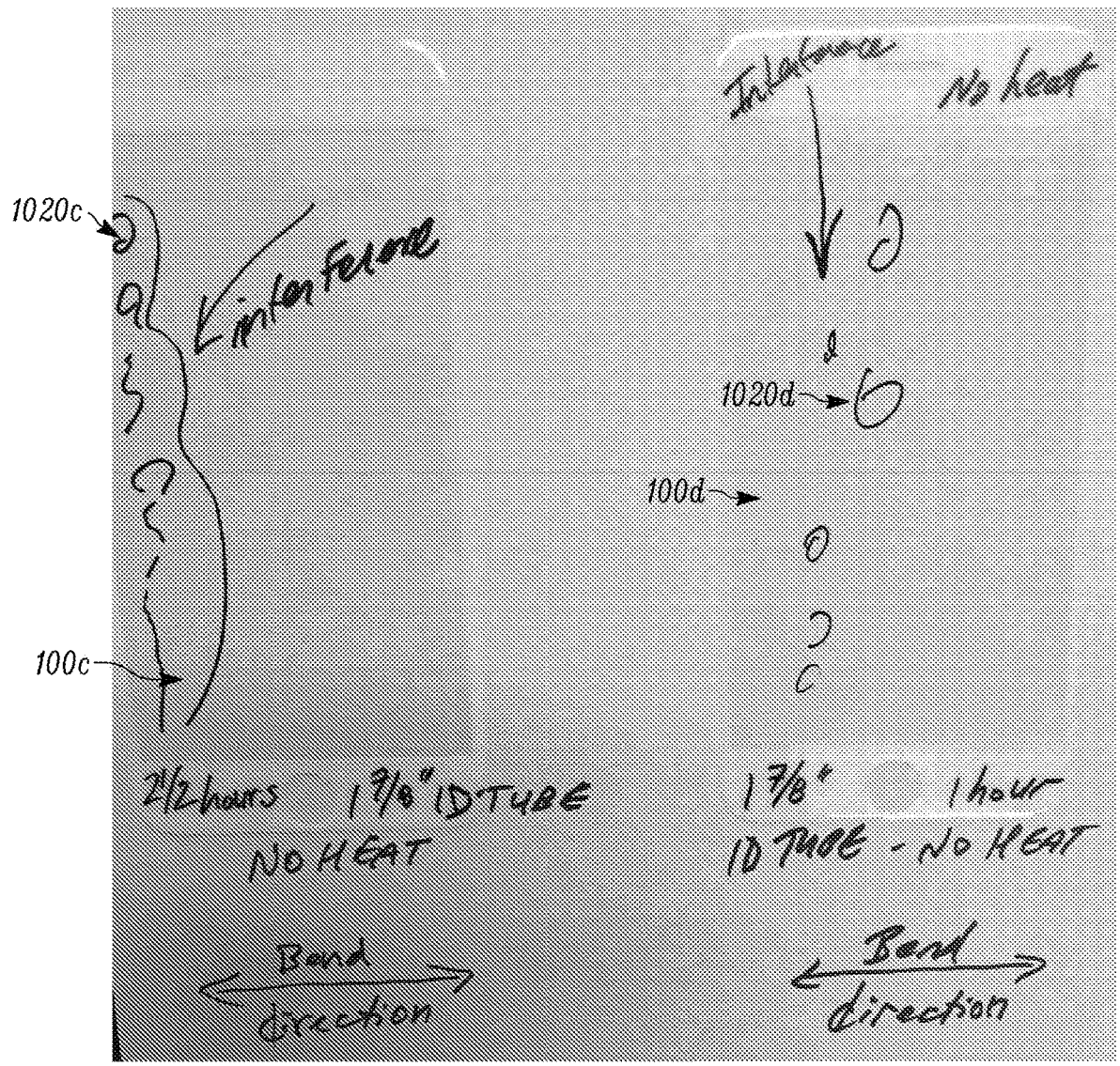
FIG. 10 shows two touch screen protectors pre formed with a longitudinal curl or curvature using different molding techniques, and details pertaining to the protectors.

As noted above, pre-formed curvature can be applied to a protector in numerous ways. The amount of curvature applied to the protector will depend on a number of factors, including the size and shape of the touch screen that the protector is designed to protect. The following description pertaining to FIGS. 9 and 10 are photographs showing four protectors that were each pre-formed with curvature using different techniques and/or process parameters. Each of the four protectors were produced with a size and shape to protect an IPHONE device. FIGS. 9 and 10 also include markings and details that, pertaining to those protectors and their performance. As discussed below, one of the protectors was surprisingly found to exhibit suitable characteristics for protecting an IPHONE without generating undesirable levels of optical interference, whereas the other protectors still produced optical interference patterns at various locations on the touch screen.

FIG. 9 shows two protector prototypes, each of which is configured to be applied with an IPHONE. The protector 100*a* on the left was pre-formed with curvature by wrapping the protector longitudinally about the outside of a tube having an outer diameter of about 2¼" (2.25 inches). The wrapped protector was left in the molding position overnight, without added heat. As identified on the central portion 910 of the protector 100*a*, attaching the protector 100*a* to a touch screen device produced small interference patterns 920 along the touch screen (the places where interference patterns were discovered were circled with a marker). These interference patterns 920 resulted from the protector 100*a* contacting, or coming close to contacting the touch screen in or around these areas.

The protector 100*b* on the right of FIG. 9 was rolled longitudinally and inserted into a tube having an inner diameter of about 1⅞" (1.875 inches), and left in the molding position overnight, without added heat. Because the wrapping in this example was tighter than that of the example on the left the pre-formed curl in this prototype protector was greater than that of the prototype protector on the left. As shown by the markings on this sample, the protector 100*b* on the right attached to a touch screen device without producing any visible interference or negative optical effects. Accordingly, this technique generated a suitable pre-formed curvature for a protector designed to be used with an IPHONE.

FIG. 10 also shows two protectors 100*c,d*, each of which is configured to be applied with an IPHONE. Each tube was rolled longitudinally and inserted into a tube having an inner diameter of about 1⅞" (1.875 inches). The tube on the left was left in the molding position for about 2.5 hours, without added heat, and the tube on the right was left in the molding position for about 1 hour, without added heat. As identified on the central portion of each protector, when the protectors were applied to the touch screen device they both produced small interference patterns 1020*c,d*, These interference patterns 1020*c,d* resulted from the protectors 100*c,d* contacting, or coming close to contacting the touch screen in or around these areas. While the resulting products produced some interference patterns, it was discovered that the shields with pre-formed curvature in many situations was significantly better than shields without pre-formed curvature. That is, even though interference patterns were identified in these examples, the resulting appearance was at least as good as, if not better than shields without any pre-formed curvature. This is particularly true for the example protector 100*b* shown in FIG. 9.

FIGS. 2-10 show examples of prototype protectors and the molding techniques that were used to generate them. These prototypes were made to test the functionality of pre-curved protectors, and to determine suitable ranges of curvature levels. It is appreciated that in certain settings, particularly large scale industrial settings, using the 'wrapping' techniques described herein may not be as efficient or effective as other techniques. Moreover, certain protector products, particularly those made from rigid and/or brittle materials like glass, may be better formed using alternative techniques that do not risk exposing the protector to breaking. However, regardless of the techniques used to produce the pre-curved protectors, the aforementioned prototypes demonstrate that applying a pre-curvature to a protector can improve visibility of a touch screen through the protector by inhibiting formation of optical interferences, and provide added cushioning protection to the touch screen, all while maintaining touch sensitivity of the touch screen device through the protector.

The protectors presented in FIGS. 1-10 and described above relate generally to protectors for flat touch screens. That is, the aforementioned protectors are generally configured to protect touch screens that do not themselves have any curvature to them. It is appreciated, however, that some touch screen devices do have a curvature in the surface of the touch screen itself. One example of such a device is the SAMSUNG GALAXY S6 EDGE+ device, which has a generally flat central portion positioned between two curved edge surfaces. The present disclosure also describes protectors that are configured to protect such a curved touch screen device while maintaining separation between the touch screen and the protector.

As noted above, full adhesive protectors are often difficult to mount to touch screen devices because they can wrinkle and produce floating air bubbles between the touch screen, the protector, and the adhesive. Such full adhesive protectors can be even more difficult to mount to touch screen devices that have a curved touch screen surface. Applying a protector that does not adhere to portions of the touch screen may be better suited for such a curved touch screen application. However, maintaining separation between the protector and the curved touch screen can present challenges.

Some examples of the present touch screen protectors are configured to attach to curved touch screen devices while maintaining a separation along the touch screen that is sufficient to maintain touch sensitivity through the protector at both the flat and curved portions, while inhibiting formation of undesirable optical artifacts and interferences. The protector can be formed with a spacer (which can be, for example, a thick adhesive, an annular layer, and/or a combination thereof) that spaces the adhesive a distance away from the protector. The protector can be curved so as to form to the contours of the curved touch screen. That is, the protector can include curved edges that correspond to the curved edges of the touch screen device. Such curves can be pre-formed by a mold or other techniques as described herein.

In some examples, the protector is provided with a second pre-formed curvature that extends along the portion of the protector that corresponds to the flat surface of the touch screen. That is, the protector can be provided with a second pre-formed curvature between the curved edges of the protector. This second pre-formed curvature can generate a bow or bend between the curved edges that causes the protector to deflect upwards, away from the touch screen when attached to the device. In some aspects, the protector may not fully deflect away from the device until the edges of the protector are attached and adhered to the device. Accordingly, because the protector is pre-curved, it may be appropriate or even necessary to squeeze the side edges in order to attach the sides to the device. Squeezing these edges causes the central portion of the protector to flex upward, thereby establishing separation between the central portion of the touch screen and the central protective shield.

Some touch screen devices may comprise multiple curves, such that the touch screen curves about more than one axis, and in three dimensional space. As described above, the presently described protectors can be pre-formed with curvature that corresponds to such a three-dimensionally curved touch screen. For example, the curvature can be applied by molding the protector in a multi-axis (e.g., about the longitudinal and transverse axes), or three dimensionally shaped mold. In this manner, the protector can be provided with three, four, or even more pre-formed curvatures to facilitate attaching the protector to the appropriate touch screen. Further, as described above, the multiple curvatures can be applied in different forms, with some of the curvatures taking on a more pronounced shape so as to conform to contours of the touch screen, and other curvatures configured to provide the lift and separation from the touch screen.

Figure 14:
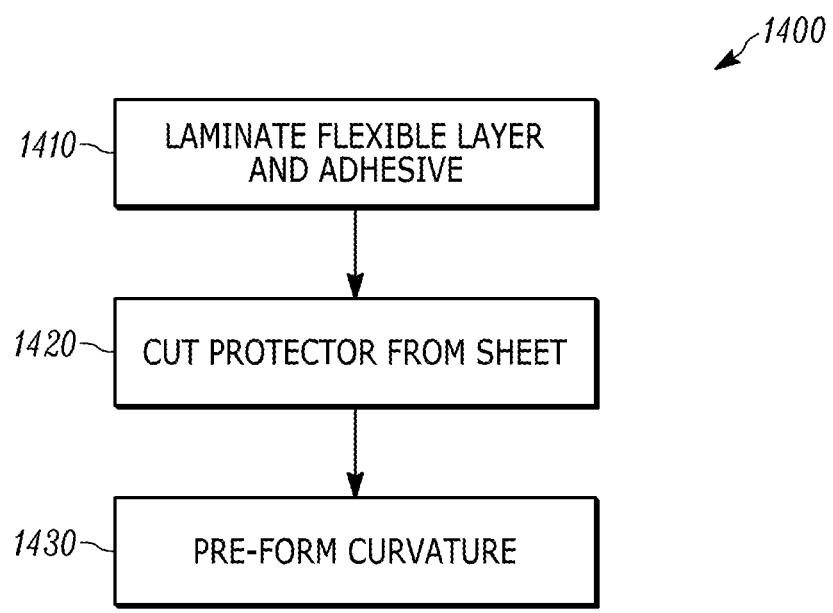
FIG. 14 is a flow diagram describing a method for forming a touch screen protector.

The present disclosure also describes methods for forming a touch screen protector. FIG. 14 shows an example of one method 1400 that includes forming a protector, such as any of the protectors described herein or in any of the Touch Screen Shield References. The forming can include laminating 1410 a base layer with an adhesive layer and then cutting the formed protector. The forming can also include applying a spacer or annular layer between the base layer and the adhesive (e.g., to form the configuration shown in FIG. 1). The forming can include applying the adhesive in a shape, pattern, or configuration to correspond to a border or inactive (or partially inactive) portion of a touch screen device.

In some examples, the method 1400 includes cutting 1420 the protector from a sheet of material. The cutting can involve stamping or other techniques. The cutting 1420 can occur before, after, or even during the lamination step 1410. For example, in some embodiments, an un-laminated base layer can be cut 1420 from a sheet of roll stock, and then laminated 1410 with an adhesive layer such that the adhesive is configured to be applied about a border area of a touch screen device. In other examples, a sheet of material can be laminated with repeating patterns of adhesive, each pattern corresponding to a single protector. After lamination, the individual protectors can be cut 1420 or stamped out as appropriate, with the laminated adhesive thereon.

The method also includes pre-forming 1430 a curvature into the protector. The pre-curvature is configured to cause the protector to bend away from a touch screen when attached to the touch screen device. The pre-forming 1430 can include molding the protector, for example, by molding and thermosetting the protector. In some examples, the pre-forming can occur by curling or rolling the protector, and maintaining the protector in the rolled position for a pre-determined period of time. For example, the molding step can include rolling the protector longitudinally and then inserting the protector into a tube (e.g. a tube having an inner diameter of 1⅞") and leaving the protector in the tube for a certain time (e.g., overnight, or between 8 to 16 hours). In some examples, the pre-forming 1430 can occur by way of molding, such that the base layer is formed via a molding process to impart a pre-formed curvature thereon. In some situations, the step of pre-forming 1430 curvature can occur before, during, or after each of the lamination 1410 and cutting steps 1420. For instance, in some examples, a base layer can be pre-formed 1420 with curvature before it is laminated 1410 with an adhesive and/or a mask layer and then cut 1420 to shape. In other situations, the pre-formed curvature can be a product of the base layer of the protector itself. For instance, where the base layer comes from a sheet of material on a roll stock, that roll stock may impart a pre-formed curvature on the base layer itself.

The present disclosure describes preferred embodiments and examples of protectors pre-formed with curvature. Those skilled in the art will recognize that a wide variety of modifications, alterations, and combinations can be made with respect to the above described embodiments without departing from the scope of the invention as set forth in the claims, and that such modifications, alterations, and combinations are to be viewed as being within the ambit of the inventive concept. In addition, it should also be understood that features of one embodiment may be combined with features of other embodiments to provide yet other embodiments as desired. In particular, it should be understood that all embodiments described herein can be applied to, and used in connection with the embodiments of shields and protectors and methods described in the Touch Screen Shield References, and variations thereof. All references cited in the present disclosure are hereby incorporated by reference in their entirety.

The invention claimed is:

1. A protector for a touch screen device, the device having a touch screen that includes an active area with a touch sensitive visual display and an inactive area, the protector comprising:
   a base layer having a shape that corresponds to the touch screen;
   an adhesive layer applied to an interior side of the protector, the adhesive layer surrounding a central portion of the protector so that no adhesive is applied on the interior side of the central portion of the protector, the protector having a shape that corresponds to the shape of the visual display;
   wherein the protector is configured to attach to the touch screen of the device so that the adhesive layer of the attached protector at least partially surrounds the visual display of the active area, and so that the attached protector covers the touch screen without the central portion of the protector adhering to the visual display of the active area, and
   wherein the protector consists of flexible film material, the protector is pre-formed with a curvature so that the central portion of the protector deflects off the visual display by a distance large enough to avoid formation of optical interference when at rest and flexes so that the central portion of the protector contacts the touch screen device to maintain touch sensitivity when manipulated by a user using normal operation forces.

2. The protector of claim 1, wherein the pre-formed curvature is curved about a longitudinal axis of the protector.

3. The protector of claim 1, wherein the protector is configured so that the central portion of the attached protector deflects off the visual display by a distance large enough to avoid formation of optical interference, and small enough to maintain touch sensitivity of the touch screen through the attached protector.

4. The protector of claim 1, wherein the protector is configured so that the central portion of the attached protector is between about 3 microns and about 400 microns off the visual display when the device is not in operation.

5. The protector of claim 1, wherein the curvature is formed via a molding process.

6. The protector of claim 1, wherein the preformed curvature is formed via a controlled industrial thermomolding process.

7. The protector of claim 1, wherein pre-formed curvature is formed by wrapping the protector around the outer diameter of a tube, cylinder, partial-tube, or partial-cylinder.

8. The protector of claim 1, wherein pre-formed curvature is formed by rolling and inserting the protector into a tube or cylinder.

9. The protector of claim 1, wherein the pre-formed curvature is formed by rolling or partially rolling the protector and maintaining the protector in a rolled or partially rolled position using a holding device.

10. The protector of claim 7, wherein the pre-formed curvature is further formed by maintaining the protector in the wrapped configuration for at least 2 hours.

11. The protector of claim 7, wherein the pre-formed curvature is formed by rolling or partially rolling the protector along the longitudinal axis of the protector.

12. The protector of claim 7, wherein the pre-formed curvature is formed by rolling or partially rolling the protector to a diameter of between about 1.5 inches and about 2.5 inches.

13. The protector of claim 1, wherein the attached protector inhibits formation of undesirable optical effects with respect to the visual display.

14. The protector of claim 1, wherein the attached protector inhibits formation of undesirable optical effects without including objects on the base layer that may affect transparency, clarity, or visibility through the protector.

15. The protector of claim 1, wherein the attached protector inhibits formation of undesirable optical effects without applying a coating to the interior surface of the protector.

16. The protector of claim 1, wherein the adhesive layer is applied about two opposing edge areas of the protector, wherein the adhesive applied about the two opposing edges serve as fixed rails that inhibit lateral movement of the protector edges when the protector is pressed.

17. The protector of claim 1, wherein the touch screen has a curved surface, and wherein the protector is configured to mount to the curved touch screen surface.

* * * * *